United States Patent [19]
Mendoza

[11] Patent Number: 5,354,505
[45] Date of Patent: Oct. 11, 1994

[54] COMPOSITION FOR THE CONDITIONING OF GAS CONTAINING ENTRAINED ASPHALTENES

[75] Inventor: Alberto L. Mendoza, Monagas, Venezuela

[73] Assignee: Corpoven, S.A., Caracas, Venezuela

[21] Appl. No.: 864,334

[22] Filed: Apr. 6, 1992

[51] Int. Cl.$^5$ .............. B01D 17/05; B01D 19/04; B01D 47/00
[52] U.S. Cl. .................. 252/358; 48/127.3; 95/253; 252/321; 252/332; 252/333; 252/334; 252/338; 252/339; 507/90
[58] Field of Search ............ 252/321, 332, 333, 334, 252/338, 339, 358; 507/90; 55/45; 95/253

[56] References Cited
U.S. PATENT DOCUMENTS

| | | | |
|---|---|---|---|
| 2,647,125 | 7/1953 | Gunderson | 252/321 X |
| 3,233,986 | 2/1966 | Morehouse | 252/321 X |
| 4,082,690 | 4/1978 | Farminer | 252/321 |
| 4,299,690 | 11/1981 | Allan | 252/358 X |
| 4,341,656 | 7/1982 | Abel | 252/321 |
| 4,431,565 | 2/1984 | Billenstein et al. | 252/331 |
| 4,557,737 | 12/1985 | Callaghan et al. | 252/321 X |
| 5,026,483 | 6/1991 | Thompson et al. | 252/358 X |

*Primary Examiner*—Richard D. Lovering
*Attorney, Agent, or Firm*—Bachman & LaPointe

[57] ABSTRACT

A method for conditioning a gas containing entrained asphaltene-containing hydrocarbons for pipeline transportation, having the steps of providing a stream of gas containing entrained asphaltene-containing hydrocarbons; and applying a surface active compound to the stream of gas, the surface active compound being a mixture of demulsifying agent, antifoaming agent, dispersant, aromatic solvent and alcohol solvent, whereby formation of emulsion from asphaltene containing hydrocarbons is prevented. The surface active compound has the following composition by volume: 5–15% demulsifying agent; 1–3% antifoaming agent; 10–40% dispersant; 10–60% aromatic solvent; and 20–60% alcohol solvent.

14 Claims, No Drawings

COMPOSITION FOR THE CONDITIONING OF GAS CONTAINING ENTRAINED ASPHALTENES

BACKGROUND OF THE INVENTION

The present invention relates to a method for conditioning gas containing entrained asphaltene-containing hydrocarbons for pipeline transportation, and a method for preparation of a surface active compound for use in such conditioning.

It is well known that gas and liquid oil products are preferably separated prior to their transportation through respective gas and oil pipelines. To this end, hydrocarbons produced from subterranean wells are regularly processed through crude-gas separation units prior to introduction to their respective transportation lines. Under some conditions, these crude-gas separation units allow liquid hydrocarbons to remain entrained within the separated gas. If the entrained crude oil contains asphaltene, the asphaltene and other entrained hydrocarbons combined with the agitation and other conditions supplied by the flow of gas combine to form an emulsion which adheres to the walls of the gas lines. Changing conditions in the gas lines result in a breaking of the adhering emulsion. Water evaporates leaving deposits of porous asphaltene on the interior surfaces of the gas lines, which themselves create obstructions in the gas lines, and which additionally act as a sieve to catch particles of other material thereby exacerbating the blockage problem.

The emulsions are formed by gradual cooling of the gas as it advances through the gas line after leaving the crude-gas separator. Condensation of water vapor and also fractions of hydrocarbons having 3 to 7 carbon atoms integrate with entrained petroleum dispersed in fine particles within the gas stream, as well as the entrained asphaltene and any inorganic material which may be present. Natural agitation caused by the flow of the fluid provides the necessary energy for formation of the emulsions, which are found to possess a high viscosity, frequently more than 60,000 centipoise, and a high capacity of adherence to the walls of the pipes. These emulsions typically have a composition by weight of 60-70% sweet water, 6-13% petroleum, 10% asphaltenes, up to 20% condensate, and up to 1% inorganic matter.

The conditions which bring about the presence of the emulsion forming products in the gas stream are various, but may include situations as follows. Hydrocarbons are occasionally produced from wells at rates which are higher than can be efficiently handled by crude-gas separating stations. If it is not feasible to also increase the capacity of the separating station, liquid hydrocarbons which may contain asphaltenes will remain in the stream of gas. Also, periods of maintenance or repair of the separation station may require hydrocarbons to be produced without the desired level of separation prior to introduction of the gas to the gas line. In these circumstances, when the flow rate is reduced or the separator is placed back on line, so that the entrainment of oil in the gas line diminishes or ceases altogether, the greater concentration of condensate in the emulsion causes the deposition of asphaltene in the gas lines, and a breaking of the emulsion, thus liberating the water. The asphaltenes deposited in the gas line adhere to the pipe as a solid porous deposit capable of entrapping inorganic particles flowing in the gas stream, resulting in restrictions in the flow area within the pipe and, in critical cases, total obstruction of the gas transportation line.

Removal of these solid deposits is accomplished with various known mechanical equipment, such as pipe scraping tools or "pipe pigs". The use of these mechanical devices requires the gas line to be temporarily shut down while the mechanical scraping of the interior of the pipes is carried out. The scraping devices also frequently produce stresses in excess of the design specifications of the pipes being cleaned. Finally, periods during which the gas line is out of action due to scraping result in wastage of the gas and condensate normally passed through the transportation lines, which must be burned during the cleaning operation. Further, the scraping operations produce solid waste materials which must then be disposed of.

It is therefore a principal object of the present invention to provide a method whereby formation of asphaltene deposits can be avoided by adding an active chemical formulation to fluids so as to inhibit emulsion formation.

It is a further object of the present invention to disclose a method for preparation of a surface-active compound for treatment of the stream of gas to achieve the above principal objects.

Other objects and advantages of the present invention will be apparent to those skilled in the art after a consideration of the following summary and detailed description of the invention.

SUMMARY OF THE INVENTION

The foregoing objects and advantages are realized by a method for conditioning a gas containing entrained asphaltene-containing hydrocarbons for pipeline transportation, comprising the steps of: providing a stream of gas containing entrained asphaltene-containing hydrocarbons; and applying a surface active compound to the stream of gas, the surface active compound comprising a mixture of demulsifying agent, antifoaming agent, dispersant, aromatic solvent and alcohol solvent, whereby formation of emulsions from asphaltene-containing hydrocarbons is prevented.

Also disclosed is a method for preparing the surface active compound used in the above method, comprising the steps of: providing a demulsifying agent in an amount of 5-15% by volume; adding an antifoaming agent in an amount of 1-3% by volume; adding a dispersant agent in an amount of 10-40% by volume; adding an aromatic solvent in an amount of 10-60% by volume; and adding an alcohol solvent in a range of 20-60% by vol., all with respect to the final volume composition.

The surface active compound of the present invention preferably has a volume composition as follows: demulsifying agent 5-15%; antifoaming agent 1-3%; dispersant 10-40%; aromatic solvent 10-60% and alcohol solvent 20-60%.

The demulsifying agent preferably comprises a sulfonic acid and a phenolic resin which are dissolved in an alcohol.

The use of the aforementioned surface active mixture prevents the formation of solid asphaltene type deposits in transportation pipelines, and maintains these asphaltenes and other materials in suspension in the gas flow for separation in liquid recovery units located along the gas line system.

DETAILED DESCRIPTION OF THE INVENTION

According to the invention, a stream of gas which contains entrained hydrocarbons including asphaltene is treated for transportation according to a method comprising the steps of: providing a stream of gas containing entrained asphaltene-containing hydrocarbons; and applying a surface active compound to the stream of gas to avoid formation of emulsions that tend to be formed by entrained asphaltene-containing hydrocarbons, thus keeping entrained asphaltene in suspension for later separation. The surface active compound comprises a mixture of demulsifying agent, antifoaming agent, dispersant, aromatic solvent, and alcohol solvent in a composition by volume as follows: demulsifying agent 5-15%; antifoaming agent 1-3%; dispersant 10-40%; aromatic solvent 10-60% and alcohol solvent 20-60%.

The volume of surface active compound to be introduced into the stream of gas is determined according to the following equation.

$$V_t = V_p \times F \text{ wherein:}$$

$V_t$ is the volume of surface-active mixture in barrels per day;

$V_p$ is a volume of petroleum entrained in a selected gas duct per day; and

F is an empirical factor selected from a range of 0.43-0.86 corresponding to a range of 5-12% by weight of asphaltene in the entrained crude.

Various known, conventional and empirical methods can be used in order to determine the value for $V_p$ (the volume of petroleum entrained in the gas duct per day).

According to the invention, $V_t$ preferably falls in the range of 0.01-10 gallons of surface active compound per MCF of gas.

Also, the preferred system of measurement of $V_p$ is a system disclosed in U.S. patent application Ser.No. 07/928,289, filed Aug. 12, 1992, which issued on Apr. 12, 1994 as U.S. Pat. No. 5,301,536, the teachings of which are incorporated herein by reference.

The surface active mixture is applied to a stream of gas through conventional means, preferably in a continuous fashion. The mixture can be injected in more than one location along the gas line. Each location is preferably an area where the temperature is equal to or greater than a temperature 10° C. below the temperature of the crude-gas separator from which the gas stream is flowing.

The surface active compound of the present invention is prepared according to the following procedure. A mixture is made of a demulsifying agent, an antifoaming agent, a dispersant, an aromatic solvent, and an alcohol solvent according to the following volume composition as follows: demulsifying agent 5-15%; antifoaming agent 1-3%; dispersant 10-40%; aromatic solvent 10-60% and alcohol solvent 20-60%.

The demulsifying agent comprises a solution of a sulfonic acid, a phenolic resin, and alcohol. This demulsifying agent is formed by first dissolving the phenolic resin in an amount of 10-40% by volume of the demulsifying agent in the alcohol. The sulfonic acid is then added during continuous agitation, and at a rate sufficiently slow to maintain a temperature preferably less than or equal to 104° F. (40° C.), in an amount equal to 30-60% by volume of the demulsifying agent. The amount of alcohol used is selected so as to round out the composition of the demulsifying agent.

The above-indicated order of preparation of the demulsifying agent is apparently important to obtaining a surface active mixture which possesses the desired attributes.

Suitable sulfonic acids may include dodecylbenzenesulfonic acid, phenylsulfonic acid, dioctylsulfonic acid, and petroleum sulfonates, and mixtures thereof.

Preferred phenolic resins include, for example, those of nonylphenyl O-ethoxylated type with 4 mols of ethylene oxide, phenolic resins of the novolak type (catalyzed in acidic base), alkyl phenolic resins and phenolformaldehyde resins. The preferred phenolic resin has a molecular weight in the range of 3500-5000.

The antifoaming agent is preferably one of silicone type, and may be polydimethyl siloxane having a viscosity of 300-60,000 CS, or a block polymer of ethylene oxide or propylene oxide.

The dispersant agent may preferably comprise an oleyl imidazoline.

The aromatic solvent may preferably be benzene, toluene, xylene, or residues of BTX distillation.

The alcohol solvent is preferably methanol, ethanol, propanol, isopropanol, butanol, isobutanol, pentanol, hexanol, and isomers of pentanol and hexanol, and more preferably will be an alcohol solvent having 1-4 carbon atoms.

Experiments have been conducted using various combinations of demulsifying agents. These experiments were conducted using a sample of pasty emulsion formed in a gas scrubber at the Musipan Station in the north of Monagas, Venezuela. Variously constituted demulsifying mixtures were added to samples in graduated 8 ounce bottles at different doses within the range of 0.1-0.5 ml. of mix per each 100 ml. of emulsion. The testing bottles were agitated and then left to stand. As shown in Table 1, the mixture containing the combination of phenolic ethoxylated resin, sulfonic acid and alcohol achieved the greatest separation of water within the shortest time, indicating the highest rate of breakdown of the emulsion.

TABLE I

|  | Composition | Volume % | % Water separated after 3 hrs. |
| --- | --- | --- | --- |
| Formulation A | Sulfonic acid | 50 | 95.6% |
|  | Phenolic O.E. resin | 20 |  |
|  | Isobutanol | 30 |  |
| Formulation B | Pure phenolic resin | 7.7 | 44.1% |
|  | Phenolic O.E. resin | 15.4 |  |
|  | Isobutanol | 76.9 |  |
| Formulation C | Pure phenolic resin | 23 | 36.8% |
|  | Isobutanol | 77 |  |
| Formulation D | Phenolic O.E. resin | 23 | 29.4% |
|  | Isobutanol |  |  |

EXAMPLE 1

The emulsion was treated experimentally with three different formulations as set forth in Table II. In table II, the antifoaming agent was polydimethyl siloxane, the dispersant was imidazoline, the aromatic solvent was a residue from a BTX (alkyl benzene) distillation plant, and the alcohol solvent was isobutanol. From a consideration of Table II, the effect of variations of the amount of each ingredient can be seen.

TABLE II

| Experiment Time Suspended | % Vol | DOSIS PPM | % WATER REMOVED | CHARACTERISTICS Water Interface | CHARACTERISTICS Solids Oleous Phase |
|---|---|---|---|---|---|
| SURFACE-ACTIVE MIXTURE #1 | | 1000 | 90 | | |
| Demulsifying Formulation | 6 | | | | Defined 4 hrs. |
| Antifoaming A Agent | 1 | | | Mobile | |
| Dispersant | 10 | | | | |
| Aromatic Solvent | 60 | | | | |
| Alcoholic Solvent | 23 | | | | |
| SURFACE-ACTIVE MIXTURE #2 | | 1000 | 98 | | |
| Demulsifying Formulation | 10 | | | | Defined 18 hrs. |
| Antifoaming C Agent | 2 | | | Mobile | |
| Dispersant | 25 | | | | |
| Aromatic Solvent | 33 | | | | |
| Alcoholic Solvent | 30 | | | | |
| SURFACE-ACTIVE MIXTURE #3 | | 1000 | 99 | | |
| Demulsifying Formulation | 15 | | | | Defined 36 hrs. |
| Antifoaming A Agent | 3 | | | Mobile | |
| Dispersant | 40 | | | | |
| Aromatic Solvent | 15 | | | | |
| Alcoholic Solvent | 27 | | | | |

Experimental Field Test

The methods of the present invention were tested in a crude production system in the area north of Monagas, Venezuela, where continuous problems have been encountered because of deposition of asphaltenes in a 26 inch diameter, 130 km. gas line located in Jusepin-Cryogenic Extraction Plant in San Joaquin, Venezuela. The problem is caused by crude entrained in the various gas sources from the Jusepin, Muri, Musipan, Carito and Santa Barbara separation stations, which are flow stations handling the hydrocarbon production from oil fields located in the north of the State of Monagas, Venezuela. These depositions of asphaltenes resulted in an increase of the operating pressure and plugging of the gas rectifying equipment of the Muscar, Aguasay 5A, Soto and the San Joaquin Extraction Cryogenic Plant stations.

A 95 km. stretch of the 130 km. gas pipeline was cleaned with a pipe pig and 35 cubic meters of solid waste, which was obstructing the flow in the pipeline, were taken out. Since the asphaltene deposition problem is a recurrent one with this pipeline, the surface active mixture of the present invention was developed and applied to this pipeline in the indicated conditions. Periodic runs of the pipe pig were still maintained, in order to gauge the removal of solid wastes in the pipe while the surface active mixture was in use. During the period of use of the surface active mixture, the volume of solid waste removed by the periodic runs of the pipe pig amounted to only 0.01 cubic meters generated over the entire 130 km. stretch of pipe. The plugging problem of the rectifying equipment was completely eliminated, and the transportation capacity of the gas duct was increased from 300 to 550 MMSCF/day, under the same operating conditions. Cleaning operations of the gas rectifier equipment, which were formerly required every 45 days, were revised to be conducted once every 5 months. Although the crude entrainment values of the gas stream of this system were in the order of 10 barrels of crude per MMMSCF, and reached maximum values of up to 300 barrels of crude per MMMSCF, utilization of the methods of the present invention reduced the production of solid wastes to virtually nil.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for preparing a surface active composition for treatment of gas containing entrained asphaltene-containing crude, comprising the steps of:
   providing as a demulsifying agent a sulphonated phenolic resin in an amount of 5-15% by volume with respect to the final composition;
   adding an antifoaming agent in an amount of 1-3% by volume with respect to the final composition;
   adding a dispersant agent in an amount of 10-40% by volume with respect to the final composition;
   adding an aromatic solvent in an amount of 10-60% by volume with respect to the final composition; and
   adding an alcohol solvent in a range of 20-60% by volume with respect to the final composition.

2. A method according to claim 1, wherein the demulsifying agent is formed by first dissolving a phenolic resin in alcohol and subsequently adding a sulfonic acid during continuous agitation and at a rate sufficiently slow to maintain a temperature no higher than about 104° F.

3. A method according to claim 2, wherein the phenolic resin is added in an amount of 10-40% by volume with respect to the final demulsifying agent composition, and the sulfonic acid is added in a range of 30-60% by volume with respect to the final demulsifying agent composition.

4. A method according to claim 3, wherein the phenolic resin is nonyl phenolic o-ethoxylated resin having 4 mols of ethylene oxide.

5. A method according to claim 3, wherein the phenolic resin is an alkyl, phenol formaldehyde.

6. A method according to claim 5 wherein the phenolic resin is a novolak alkyl phenol formaldehyde.

7. A method according to claim 3, wherein the sulfonic acid is selected from a group consisting of dodecylbenzenesulfonic acid, phenylsulfonic acid, dioctylsulfonic acid, and petroleum sulfonates, and mixtures thereof.

8. A method according to claim 3, wherein the alcohol is selected from a group consisting of alcohols of methanol, ethanol, propanol, butanol, isobutanol, pentanol, hexanol, and isomers of pentanol hexanol and mixtures thereof.

9. A method according to claim 1, wherein the antifoaming agent is a silicone.

10. A method according to claim 9, wherein the silicon antifoaming agent is polydimethyl siloxane having a viscosity of 300-60,000 CS.

11. A method according to claim 9, wherein the silicon antifoaming agent comprises block polymers of ethylene oxide or propylene oxide.

12. A method according to claim 1, wherein the dispersant agent is an oleyl imidazoline 13. A method according to claim 1, wherein the aromatic solvent is selected from a group consisting of benzene, toluene, xylene, residues of BTX distillation and mixtures thereof.

14. A surface active composition for conditioning gas containing entrained asphaltenes, consisting essentially of from 5-15% by volume as a demulsifying agent a sulphonated phenolic resin, 1-3% by volume antifoaming agent, 10-40% by volume dispersant, 10-60% by volume aromatic solvent, and 20-60% by volume alcohol solvent.

* * * * *

UNITED STATES PATENT AND TRADEMARK OFFICE
CERTIFICATE OF CORRECTION

PATENT NO. : 5,354,505

DATED : October 11, 1994

INVENTOR(S) : Alberto L. Mendoza

It is certified that error appears in the above-identified patent and that said Letters Patent is hereby corrected as shown below:

In Column 6, claim 10, lines 66-67, "silicon" should read --silicone--.

In Column 7, claim 11, lines 1-2, "silicon" should read --silicone--.

Signed and Sealed this

Seventh Day of March, 1995

*Attest:*

BRUCE LEHMAN

*Attesting Officer*     *Commissioner of Patents and Trademarks*